United States Patent [19]

Ho

[11] Patent Number: 5,777,065
[45] Date of Patent: Jul. 7, 1998

[54] POLYESTERS FROM DILUTE DICYCLOPENTADIENE

[75] Inventor: Kam Wah Ho, Calgary, Canada

[73] Assignee: Nova Chemicals Ltd., Calgary, Canada

[21] Appl. No.: 686,084

[22] Filed: Jul. 22, 1996

[51] Int. Cl.⁶ ................................................. C08G 63/02
[52] U.S. Cl. ............................................. 528/272; 528/271
[58] Field of Search ........................... 428/430; 528/271, 528/272

[56] References Cited

U.S. PATENT DOCUMENTS 4,029,848  6/1977  Nelson ..................................... 428/430

*Primary Examiner*—Terressa Mosley
*Attorney, Agent, or Firm*—Kenneth H. Johnson

[57] ABSTRACT

Polyesters having a reduced gel content may be made from dicyclopentadiene having a purity of less than about 90% by incorporating from 30 to 200 ppm of an aromatic inhibitor into the dicyclopentadiene prior to reacting the glycol and carboxylic acid to form the polyester.

14 Claims, No Drawings

POLYESTERS FROM DILUTE DICYCLOPENTADIENE

FIELD OF THE INVENTION

The present invention relates to polyester alkyd resins. More particularly the present invention relates to a method to reduce gel in the manufacture of polyester alkyd resins from a low purity dicyclopentadiene stream comprising from 75 to 85 weight % of dicyclopentadiene, from 2 to 5 weight % of $C_{4-8}$ alkenes or dialkenes up to about 1 weight % of a trimers and co-trimers (e.g. $C_{15}$) component, and the balance $C_{9-11}$ dimers and co-dimers of one or more alkenes selected from the group consisting of pentadiene and $C_{4-6}$ dienes.

BACKGROUND OF THE INVENTION

U.S. Pat. No. 4,029,848 issued Jun. 14, 1977 to Nelson, assigned to the Dow Chemical Company, discloses a process to make alkyd polyester ester resins using a "low purity" dicyclopentadiene. According to the reference from 0.05 to 0.3 moles of the low purity stream of dicyclopentadiene is mixed with about one mole of dicarboxylic acid and from about 2 to 2.3 moles of glycol. The mixture is heated to form a polyester alkyd resin. Then optionally a small amount of inhibitor such as tertiary butyl catechol is added to the polyester alkyd resin and a small amount of crosslinking agent such as styrene monomer and a free radical initiator is added to the polyester alkyd resin. The resulting mixture may be used to impregnate a substrate such as woven glass and then allowed to cure. The patent application does not acknowledge that there may be an undesirable formation of gel if a stream of low purity dicyclopentadiene is heated in the presence of an anhydride of a dicarboxylic acid.

The current "low purity" grades of dicyclopentadiene appear to have a dicyclopentadiene content of not less than about 83 weight %. However, the $C_{4-6}$ stream of alkenes may be dimerized to produce a dicyclopentadiene stream having a purity of less than about 90% of dicyclopentadene. Before such resins can be used commercially to produce polyester alkyd resins the steams have to be purified as there is a tendency of such streams to produce an unacceptably high level of gels in the resulting polyester alkyd resin. There is a need for a formulation to permit the use of such streams of dicyclopentadiene directly in the manufacture of polyester alkyd resins without further purification. The present invention seeks to provide such a process.

SUMMARY OF THE INVENTION

The present invention provides a process to reduce the formation of gel in the manufacture of a polyester alkyd resin having an acid number from 15 to 40, comprising heating a mixture comprising from 0.5 to 2.5, preferably from 0.8 to 1.3 moles of a dicarboxylic acid or an anhydride of a dicarboxylic acid; from 0.5 to 1.5, preferably from 0.7 to 1.0 moles of a glycol and from 0.5 to 1.5, preferably from 0.7 to 1.2 moles based on the dicyclopentadiene content of a dicyclopentadiene stream which comprises from 75 to 90 weight % of dicyclopentadiene, from 2 to 5, preferably 2 to 3 weight % of $C_{4-8}$ alkenes or dialkenes up to about 1 weight % of a $C_{15}$ component and the balance $C_{9-11}$ dimers and co-dimers of one or more alkenes selected from the group consisting of pentadiene and $C_{4-6}$ dienes which comprises adding to said dicyclopentadiene stream prior to reaction from 10 to 300 ppm, preferably from 30 to 200 ppm, based on the weight of said dicyclopentadiene stream of an aromatic inhibitor.

DETAILED DESCRIPTION

Preferably the dicarboxylic acid or anhydride is selected from the group consisting of unsaturated dicarboxylic acids and anhydrides including maleic acid, fumaric acid, mesaconic acid, itaconic acid citraconic acid, maleic anhydride, and phthalic anhydride, preferably an anhydride, most preferably maleic anhydride. However, a mixture of saturated and unsaturated dicarboxylic acids and anhydrides may be used provided there are sufficient unsaturated dicarboxylic acids present to permit the reaction of the unsaturation in the dicarboxylic acid in the curing of the unsaturated polyester. Suitable saturated dicarboxylic acid and anhydrides include orthophthalic acid or anhydride, terephthalic acid, isophthalic acid, adipic acid, sebacic acid, succinic acid and anhydrides of such acids. Some of the more "bulky" unsaturated dicarboxylic acids may be used to add stiffness to the resulting polyester alkyd resin.

Preferably the glycol is selected from the group consisting of ethylene glycol, propylene glycol and dipropylene glycol.

Typically the stream of dicyclopentadiene comprises from 78 to 90, generally from 78 to 87 weight % dicyclopentadiene, from 2 to 3 weight % of $C_{4-8}$ alkenes or dialkenes up to about 1 weight % of trimers or co-trimers and the balance $C_{9-11}$ dimers and co-dimers of one or more alkenes selected from the group consisting of pentadiene and $C_{4-6}$ dienes. The trimers and co-trimers may be trimers of dicyclopentadiene or co-trimers of dicyclopentadiene and one or more dienes (typically $C_{4-6}$).

The aromatic inhibitor may be selected from the group of inhibitors consisting of a $C_{6-10}$ cyclic aromatic ring which is substituted by at least one, preferably two, hydroxyl radicals from zero to two lower alkyl groups. The lower alkyl groups may be selected from the group consisting of $C_{1-4}$ straight or branched alkyl radicals. Preferably the aromatic ring contains six carbon atoms.

Preferably the inhibitor is of the formula

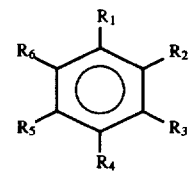

wherein at least one of $R_1$, $R_2$, $R_3$, $R_4$, $R_5$, and $R_6$ is a hydroxyl radical and the remaining substitutents are selected from the group consisting of a hydrogen atom and a $C_{1-4}$ straight or branched alkyl radical.

Suitable inhibitors include hydroquinone, t-butyl hydroquinone, catechol, and t-butyl catechol.

In the process of the present invention the inhibitor is mixed with the stream of low purity dicyclopentadiene in an amount from 30 to 200 ppm, preferably from 40 to 100 ppm, by weight based on the weight of the stream of the low purity dicyclopentadiene. The dicyclopentadiene stream is then mixed with the dicarboxylic acid or anhydride of the dicarboxylic acid and the glycol in the above noted amounts. It is possible to use an anhydride and then add water to the mixture to first convert the anhydride to the dicarboxylic acid. The resulting mixture is then heated at a temperature from 100° to 180° C., preferably in the range from about 110° to 150° for a period of time to reduce the acid number of the resulting polyester alkyd resin to less than 35, preferably from 15 to 40. The acid number is obtained by titrating the resulting polyester alkyd resin with a base, preferably both are in an organic solvent such as a lower alcohol. The acid number is then (the milliliters of titrant) ×(molar concentration of base in the titrant)×(molecular weight of base) divided by (the weight of polyester alkyd resin (in grams)). While not necessary it is preferable if the reaction is conducted under an inert atmosphere. Preferably the reaction is carried out in a Dean Stark separator under reflux conditions to remove the water of condensation and retain any organic solvent.

In accordance with the teaching of U.S. Pat. No. 4,029,848 additional inhibitor may be added to the resulting polyester alkyd resin in an amount of about 100 to 150 ppm based on the weight of the crosslinking agent to be added to the resin. The inhibitor may be selected from the group of inhibitors listed above.

The polyester alkyd resin is then mixed with a crosslinking agent. Typically the crosslinking agent is selected from the group consisting of styrene, alpha methyl styrene, chlorostyrene, vinyl toluene, divinyl benzene, vinyl acetate, acrylic acid, methacrylic acid, $C_{1-6}$ alkyl esters of acrylic acid, $C_{1-6}$ alkyl esters of methacrylic and diallyl phthalate. Generally the crosslinking agent is used in an amount from 1 up to about 30 parts by weight per 100 parts of polyester alkyd resin. Additionally, there is added to the mixture from 1 to 5 parts by weight of a peroxide initiator. Typically the peroxide initiator will be an organic initiator. Suitable organic initiators include benzoyl peroxide, di-tert-butyl peroxide; lauryl peroxide; oleyl peroxide; toluyl peroxide; di-tert-butyl diperphthalate; tert-butyl peracetate; tert-butyl perbenzoate; and dicumyl peroxide. The initiator may be selected to generate free radicals at the desired curing temperature to reduce the potential of premature curing. Care should be taken when using peroxide initiators. Additionally the peroxide initiators may be used with accelerating agents naphthalene salts (e.g. cobalt naphthalene) and organic bases (e.g. dimethyl aniline and other unsubstituted or lower alkyl ($C_{1-4}$) substituted derivatives of aniline).

The mixture of alkyd resin, crosslinking agent and peroxide initiator may then be mixed with or coated onto a suitable substrate such as glass or other high strength fibers such as carbon fibers and cured to produce a final product. While in most instances a fibrous reinforcement is used, in some instances the polyester alkyd resin, crosslinking agent and initiator need not be applied together with or to a reinforcing agent. Typically the resulting system will be cured at temperatures from room temperature up to about 120° C. for a period of time which may range from about thirty minutes up to 24 hours depending on the size of the mold and the mixture of components.

The present invention is illustrated by the following non-limiting examples in which, unless otherwise specified, parts means parts by weight (e.g. grams).

EXAMPLE 1

A commercially available sample of dicyclopentadiene (DCPD) was obtained. The sample contained 90% or more of dicyclopentadiene. A sample of a dilute dicyclopentadiene stream was obtained from Novacor Chemicals Canada Ltd. The sample comprised about 81 weight % of dicyclopentadiene, about 3 weight % of $C_{4-8}$ dienes, about 14 weight % of a stream which was dimers and co-dimers of one or more of $C_{4-8}$ dienes and dicyclopentadiene and about 1 weight % of a $C_{15}$ component (e.g. trimers and co-trimers).

Several alkyd polyester resins were prepared by heating a mixture comprising an anhydride of a dicarboxylic acid: di lower alkylene glycol: and the dicyclopentadiene stream in a molar ratio of about 1.4:1:1.1. The resulting mixture was refluxed under an inert atmosphere using a Dean Stark trap at a temperature from 110° to 120° C. until the resulting alkyd resin had an acid number of below 30. In the samples prepared using commercial DCPD there was nothing unusual about the condensation reaction. In the samples of dilute DCPD from Novacor there was a visible gel present. All of the alkyd resin samples were mixed with styrene in a weight ratio of about 3:1 and filtered using a 250 μm screen and the gel was recovered, washed in acetone and dried. The gel obtained in the alkyd resin prepared from the dilute DCPD was about 0.23% (based on the alkyd resin prior to the addition of styrene).

An analysis of the gel suggested that it was formed by a reaction between the maleic anhydride and the impurities in the "dilute" DCPD.

The condensation reaction was repeated except that various amounts of an inhibitor, which was a dihydroxy lower alkyl substituted $C_6$ aromatic ring, was added to the dilute DCPD prior to the condensation. When 28 ppm of inhibitor was added to the DCPD based on the entire weight of the dilute dicyclopentadiene stream the gel content was about 0.17% and when 200 ppm of inhibitor was added to the dilute DCPD stream the gel content was reduced to 0.08 weight %.

All of the resulting polyester alkyd resins were crosslinked and tested for physical properties in a similar manner. To 100 g of alkyd resin and 34 g of styrene monomer was added 1 g of benzoyl peroxide. Air bubbles were removed from the samples and the samples were molded in a prewaxed sheet mold for 20 hours at increasing temperatures from 55° C. up to 118° C. Tensile samples were cut from the sheet and were tested according to ASTM methods D790 and D638.

The results are set forth in Table 1.

TABLE 1

| Sample | Flex Modulus (MPa) | Flex Strength (MPa) | Tensile Strength at Break (kPa) | Tensile Modulus (MPa) | Elongation at Break (%) |
|---|---|---|---|---|---|
| Commercial DCPD | 3751 | 97,256 | 31.13 | 2530 | 1.3 |
| Dilute DCPD No inhibitor | 3624 | 92,702 | 26.47 | 2094 | 1.5 |
| Dilute DCPD 30 ppm Inhibitor | 3840 | 86,963 | 26.89 | 2253 | 1.4 |
| Dilute DCPD 40 ppm Inhibitor | 3622 | 90,643 | 27.00 | 2299 | 1.5 |

The data shows that the flexural properties and the tensile properties of the commercial DCPD and the dilute DCPD containing 30 and 40 ppm of inhibitor are comparable.

What is claimed is:

1. A process to reduce the formation of gel in the manufacture of a polyester alkyd resin having an acid number from 15 to 40, comprising heating a mixture comprising from 0.5 to 2.5 moles of a dicarboxylic acid or an anhydride of a dicarboxylic acid; from 0.5 to 1.5 moles of a glycol and from 0.5 to 1.5 moles based on the dicyclopentadiene content of a dicyclopentadiene stream which comprises from 75 to 90 weight % of dicyclopentadiene, from 2 to 5 weight % of $C_{4-6}$ alkenes or dialkenes up to about weight % of a $C_{15}$ component and the balance $C_{9-11}$, dimer and co-dimers of one or more alkenes selected from the group consisting of pentadiene and $C_{4-8}$ dienes which com prises adding to said dicyclopentadiene stream prior to reaction from 10 to 300 ppm based on the weight of said dicyclopentadiene stream of an aromatic inhibitor.

2. The process according to claim 1 wherein said dicarboxylic acid or anhydride is selected from the group consisting of maleic acid, fumaric acid, mesaconic acid, itaconic acid, citraconic acid, maleic anhydride and phthalic anhydride.

3. The process according to claim 2, wherein said glycol is selected from the group consisting of ethylene glycol, propylene glycol and dipropylene glycol.

4. The process according to claim 3 wherein said dicyclopentadiene stream comprises from 78 to 90 weight % dicyclopentadiene, from 2 to 3 weight % of $C_{4-8}$ alkenes or dialkenes up to about 1 weight % of trimers and co-trimers and the balance $C_{9-11}H_{44}$ dimers and co-dimers of one or more alkenes selected from the group consisting of pentadiene and $C_{4-8}$ dienes.

5. The process according to claim 4, wherein said inhibitor is selected from the group of inhibitors consisting of a $C_{6-10}$ cyclic aromatic ring which is substituted by at least one hydroxyl radicals from zero to two $C_{1-4}$ branched or straight chained alkyl groups.

6. The process according to claim 5, wherein said inhibitor has the formula

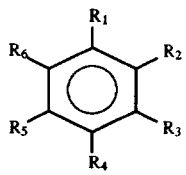

wherein at least one of $R_1$, $R_2$, $R_3$, $R_4$, $R_5$, and $R_6$ is a hydroxyl radical and the remaining substitutents are selected from the group consisting of a hydrogen atom and a $C_{1-4}$ straight or branched alkyl radical.

7. The process according to claim 6, wherein said dicarboxylic acid or anhydride is an anhydride.

8. The process according to claim 7, wherein said inhibitor is present in an amount from 30 to 200 ppm by weight based on the weight of the stream of the dicyclopentadiene.

9. The process according to claim 8, wherein said inhibitor is selected from the phenolic type inhibitor group consisting of hydroquinone, catechol, and t-butyl catechol.

10. The process according to claim 7, wherein said anhydride is present in an amount from 0.8 to 1.3 moles, said glycol is present in an amount from 0.7 to 1.0 moles and said dicyclopentadiene is present in an amount from 0.7 to 1.2 moles.

11. A polyester alkyd resin produced according to claim 1.

12. A polyester alkyd resin produced according to claim 8.

13. A polyester alkyd resin according to claim 11, further comprising per 100 parts by weight of polyester alkyd resin from 1 to 30 parts by weight of a monomer selected from the group consisting of styrene, alpha methyl styrene, chlorostyrene, vinyl toluene, divinyl benzene, vinyl acetate, acrylic acid, methacrylic acid, $C_{1-6}$ alkyl esters of acrylic acid, $C_{1-6}$ alkyl esters of methacrylic and diallyl phthalate and from 1 to 5 parts by weight of a peroxide initiator.

14. A polyester alkyd resin according to claim 12, further comprising per 100 parts by weight of polyester alkyd resin from 1 to 30 parts by weight of a monomer selected from the group consisting of styrene, alpha methyl styrene, chlorostyrene, vinyl toluene, divinyl benzene, vinyl acetate, acrylic acid, methacrylic acid, $C_{1-6}$ alkyl esters of acrylic acid, $C_{1-6}$ alkyl esters of methacrylic and diallyl phthalate and from 1 to 5 parts by weight of a peroxide initiator.

* * * * *